United States Patent
Yu

(10) Patent No.: US 11,089,112 B2
(45) Date of Patent: Aug. 10, 2021

(54) LOW LATENCY INTERACTIVE MEDIA DISTRIBUTION USING SHARED USER HARDWARE

(71) Applicant: Facebook, Inc., Menlo Park, CA (US)

(72) Inventor: Xingchen Yu, Bothell, WA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 16/547,169

(22) Filed: Aug. 21, 2019

(65) Prior Publication Data

US 2021/0058468 A1 Feb. 25, 2021

(51) Int. Cl.
*H04L 29/08* (2006.01)
*A63F 13/358* (2014.01)
(Continued)

(52) U.S. Cl.
CPC .......... *H04L 67/141* (2013.01); *A63F 13/358* (2014.09); *G06F 16/29* (2019.01); *H04L 63/0407* (2013.01); *H04L 63/0861* (2013.01); *H04L 63/101* (2013.01); *H04L 63/107* (2013.01); *H04L 65/1069* (2013.01);
(Continued)

(58) Field of Classification Search
CPC .. A63F 13/358; A63F 13/46; A63F 2300/534; A63F 13/335; G06F 16/29; G06F 16/433; G06F 3/0482; H04L 65/1073; H04L 65/60; H04L 67/18; H04L 67/20; H04L 67/102; H04L 51/10; H04L 12/1822; H04L 63/0407; H04L 63/0861; H04L 63/101; H04L 63/107; H04L 65/1069; H04L 65/80; H04L 67/141; H04L 67/22; H04L 67/2814; H04L 67/306; H04L 67/38; G06N 20/00; G06Q 30/20; G06Q 50/10;
(Continued)

(56) References Cited

U.S. PATENT DOCUMENTS

2006/0106938 A1 * 5/2006 Dini .................... H04L 67/1002
709/228
2013/0086185 A1 * 4/2013 Desmarais ............. H04L 51/10
709/206
(Continued)

FOREIGN PATENT DOCUMENTS

WO WO2018/063332 4/2018

*Primary Examiner* — Le H Luu
(74) *Attorney, Agent, or Firm* — Mannava & Kang, P.C.; George Y. Wang

(57) ABSTRACT

According to examples, a system for providing low latency interactive media distribution using shared user hardware may include a processor and a memory storing instructions. The processor, when executing the instructions, may cause the system to register host systems as candidate host systems to host interactive media on behalf of client devices. The system may further receive client device registration data of a client device. The system may select a host system from the candidate host systems to host the interactive media on behalf of the client device. The system may thereby facilitate establishment of a to connection over a network between the client device and the selected host system. In some examples, the connection may allow the selected host system to host the interactive media on behalf of the client device and for the client device to interact with the interactive media hosted on the selected host system.

18 Claims, 10 Drawing Sheets

(51) Int. Cl.
    *G06F 16/29*     (2019.01)
    *H04L 29/06*     (2006.01)
    *H04W 40/20*     (2009.01)
(52) U.S. Cl.
    CPC .......... *H04L 65/1073* (2013.01); *H04L 65/60*
        (2013.01); *H04L 65/80* (2013.01); *H04L 67/18*
        (2013.01); *H04L 67/20* (2013.01); *H04L 67/22*
            (2013.01); *H04L 67/2814* (2013.01); *H04L
            67/306* (2013.01); *H04L 67/38* (2013.01);
            *H04W 40/20* (2013.01); *A63F 2300/534*
                                            (2013.01)
(58) Field of Classification Search
    CPC ............. G11B 27/031; H04N 21/4307; H04N
                                21/47217; H04W 40/20
    See application file for complete search history.

(56) References Cited

U.S. PATENT DOCUMENTS

| | | | |
|---|---|---|---|
| 2013/0262707 A1* | 10/2013 | Shah .................... | G06F 16/433 |
| | | | 709/248 |
| 2015/0346935 A1* | 12/2015 | Lauwers ............. | H04L 12/1822 |
| | | | 715/753 |
| 2017/0024094 A1* | 1/2017 | Gresham ................ | G06Q 50/10 |
| 2017/0034229 A1* | 2/2017 | Wong ............... | H04N 21/47217 |
| 2017/0034234 A1 | 2/2017 | Zimring | |
| 2017/0063950 A1* | 3/2017 | Ma .......................... | H04L 65/60 |
| 2017/0134464 A1* | 5/2017 | Rao ........................ | G06Q 30/02 |
| 2017/0251241 A1* | 8/2017 | Baratz .................. | G11B 27/031 |
| 2018/0302453 A1* | 10/2018 | Gurtowski ......... | H04N 21/4307 |
| 2019/0026681 A1* | 1/2019 | Rolli ....................... | A63F 13/46 |
| 2019/0321727 A1* | 10/2019 | Rodgers ................ | A63F 13/335 |
| 2019/0324602 A1* | 10/2019 | Rao ........................ | G06F 3/0482 |
| 2020/0004767 A1* | 1/2020 | Moeller-Bertram ... | G06N 20/00 |

* cited by examiner

LOW LATENCY INTERACTIVE MEDIA DISTRIBUTION USING SHARED USER HARDWARE

TECHNICAL FIELD

This patent application relates generally to interactive entertainment and digital media distribution, and more specifically, to systems and methods for providing low latency interactive media distribution using shared user hardware.

BACKGROUND

Advances in mobile telecommunications are changing the interactive entertainment landscape and gaming experience. For example, users of mobile devices, such as smartphones or tablets, can play a variety of video games and/or can interact with interactive media by streaming services over a telecommunications network. With a growing number of mobile device users over an expanding geographical footprint, it is a challenge to provision and ensure low latency, high performing streaming services.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1A:
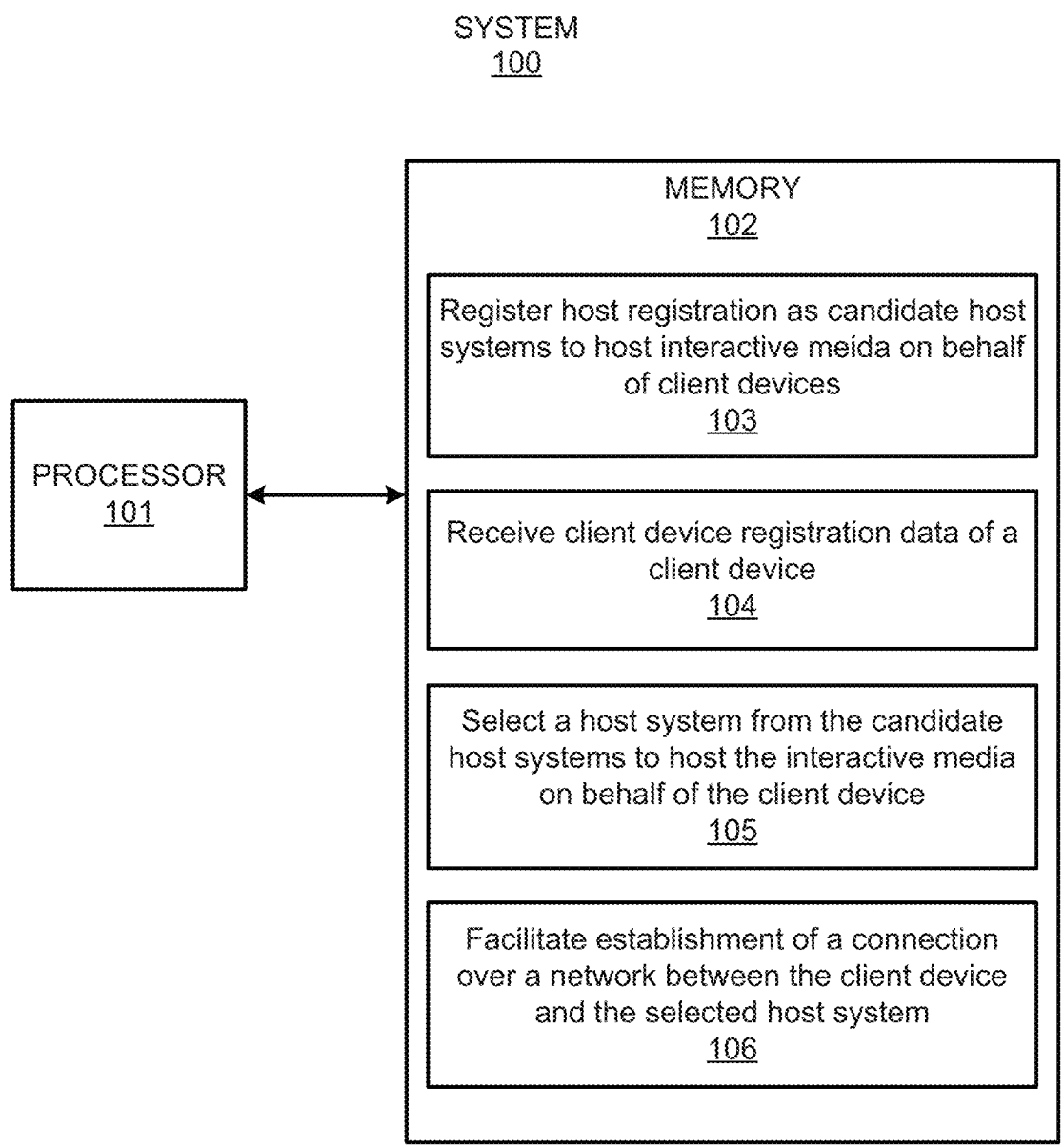
FIG. 1A illustrates a block diagram of a system for providing low latency interactive media distribution using shared user hardware, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Users of various types of client devices may stream interactive entertainment and online digital media (e.g., video games). However, video games that involve advanced video graphics and/or multi-user game play may be limited to high-performing or high-power computing hardware, such as those found in a dedicated gaming personal computer (PC) or a gaming console. In order to play such video games, the high-performing computing hardware may establish a connection with a host system located within a data center, which may or may not be physically and geographically close in proximity to the client device. The data center may include any number of host systems and servers, all of which may be clustered within the data center or in a general vicinity of the data center.

Users of low-power client devices, such as smartphones, may play a variety of interactive video games by streaming interactive video games (or other media content) over a telecommunications network from a host system of a data center operating on behalf of the client devices. A low-power client device may include a smartphone, tablet, laptop computer, or other mobile computing device that has limited processing or computing capabilities. However, a challenge with streaming services provisioned by these data centers is that users of low-power client devices may experience a significant amount of latency. Latency may increase as the physical distance between the client device and the data center increases. As a result, not only may gameplay and performance be adversely affected, but such latencies may further limit the type or number of game offerings available to users of these low-power client devices, especially when compared to owners of more powerful computing hardware.

The approaches described herein may overcome these and other issues. For example, the systems and methods described herein may enable a low-power client device to establish a communication with high-power computing hardware, which may function and serve as a third-party host system, in order for the third-party host system to host interactive entertainment or other digital media content on behalf of the client device. In other words, the third-party host system may share its high-power computing hardware or capabilities with the low-power client device. In this way, the low-power client device, which may not have the requisite computing capabilities on its own to fully interact with the interactive entertainment or digital media content, may now be able to do so via the high-power computing hardware being shared as a third-party host system. This distributed approach using shared hardware and/or computing capabilities may reduce or obviate latency issues associated with communications between the low-power client device and a host system that typically resides at a data center, which may be physically and/or geographically further away than the high-power computing hardware, operating as the third-party host system, is from the client device. By streaming from a physically and geographically closer third-party host system, the user of the low-power client device may play video games (or interact with any other interactive digital media) hosted by the third-party host system on behalf of the client device. In this way, the client device may experience improved performance (e.g., reduced latency) as a result of the reduced geographic distance. It should be appreciated that using third-party host systems and/or reducing the geographic distance between a low-power client device and a host system may also reduce latency in indirect ways as well. For example, using third-party host systems may increase the number of overall host systems available to the client devices, which in turn may create a wider distribution area for load balancing network traffic.

To establish the connection to the third-party host system, a client device, for example, may access a search feature that a server associated with a data center may operate. The search feature may help a user of the client device locate a nearby third-party host system that has registered with the server. The server may also register the client device. In this way, the server may help establish, for example, a peer-to-peer (P2P) connection or another type of network connection between the client device and the nearby third-party host system so that a desired interactive entertainment or digital media content may be streamed with low latency.

The approaches disclosed herein may not only enable low latency interactive media distribution using shared user hardware, but these approaches may also provide an efficient way to load balance various types of digital media content among a larger pool of resources (e.g., third-party host systems) across a wider geography. The systems and methods described herein may also decentralize data center reliance for digital media content and enable a more distributed shared user hardware network. This may provide additional efficiencies in processing time and energy consumption. Furthermore, such approaches may enable low-power client devices to stream more intensive interactive digital media normally limited to high-power computing devices.

It should also be appreciated that the systems and methods described herein may be particularly suited for video games and other intensive interactive entertainment, such as high-resolution multimedia content, but are also applicable to improving network communications for applications other than video games or interactive entertainment. For instance, examples of interactive entertainment and digital media content described herein may include, but are not limited to, videos, photos, social media posts, and video games, some or all of which may be associated with any number of online actions, advertisements, and/or financial transactions. These and other benefits will be apparent in the description provided herein.

Figure 1B:
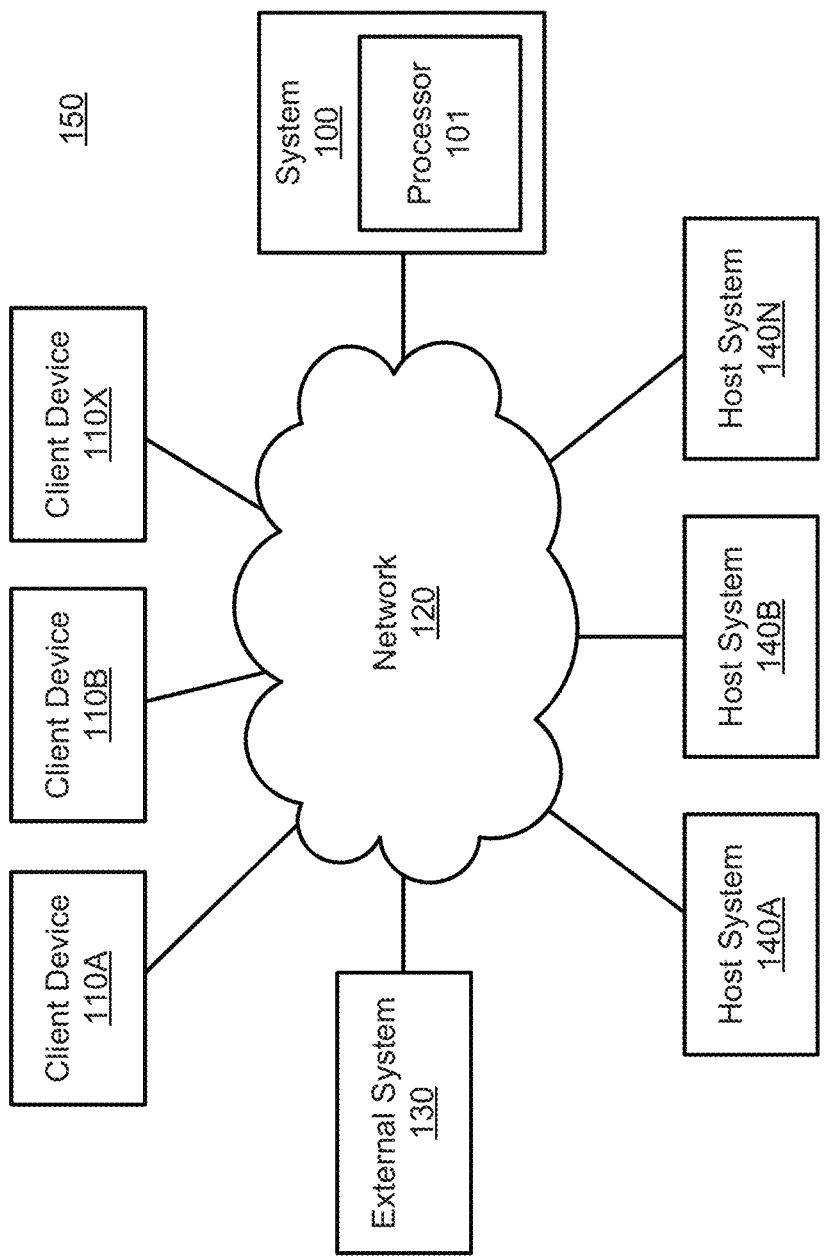
FIG. 1B illustrates a block diagram of a system environment for the system for providing low latency interactive media distribution using shared user hardware, according to an example.

Reference is now made with respect to FIGS. 1A and 1B. FIG. 1A illustrates a block diagram of a system 100 for providing low latency interactive media distribution using shared user hardware, according to an example. FIG. 1B illustrates a block diagram of a system environment 150 in which the system 100 may be implemented to provide low latency interactive media distribution using shared user hardware, according to an example. It should be appreciated that the system 100 depicted in FIGS. 1A-1B and/or the system environment 150 depicted in FIG. 1B may be examples. Thus, the system 100 and/or the system environment 150 may or may not include additional features and some of the features described herein may be removed and/or modified without departing from the scopes of the system 100 and/or the system environment 150 outlined herein.

As shown in FIG. 1B, the system environment 150 may include any number of client devices 110, shown as client devices 110A, 110B, and 110X, in which the variable "X" may represent an integer greater than one. The system environment 150 may also include a network 120, an external system 130, and any number of host systems 140, shown as host systems 140A, 140B, and 140N, in which the variable "N" may represent an integer greater than one. In some examples, the host systems 140 may be third-party host systems. It should be appreciated that the term "third-party host systems" may refer to host systems that are owned or within control of users that are different to users or owners of the system 100, and may be used interchangeably, at times, to refer to the host systems 140 in the system environment 150.

In operation, the system 100 may communicate with the client devices 110, the external system 130, the host systems 140, or other network elements via the network 120. In some examples, the system 100 may register the client devices 110, the external system 130, the host systems 140, and/or other network elements in order to coordinate interactive digital media content delivery and distribution. In some examples, the system 100 may be a social networking system, a content sharing network, an advertisement system, an online system, and/or any other system that facilitates any variety of data processing in personal, social, commercial, financial, and/or enterprise environments.

In some examples, the system 100 may include a processor 101 and a memory 102, as shown in FIG. 1A. The memory 102 may store instructions, which when executed by the processor 101, may cause the processor to register 103 host systems 140 as candidate host systems to host interactive media on behalf of client devices 110, receive 104 client device registration data of a client device 110A, select 105 a host system 140A from the candidate host systems to host the interactive media on behalf of the client device 110A, and facilitate 106 establishment of a connection over a network 120 between the client device 110A and the selected host system 140A to cause the selected host system 140A to host the interactive media on behalf of the client device 110A and for the client device 110A to interact with the interactive media hosted on the selected host system 140A. In some examples, the established connection may allow the selected host system 140A to host the interactive media on behalf of the client device 110A and for the client device 110A to interact with the interactive media hosted on the selected host system 140A.

As described in more detail below, to register the host systems 140 as candidate host systems (e.g., the host system 140A), the processor 101, as instructed by machine-readable instructions stored in the memory 102, may receive host registration data from the candidate host systems. In some examples, the host registration data may include, among other things, host hardware specification data, geographic location data, and host system availability data. The processor 101 of the system 100 may use this information to determine that the host hardware specification data meets predetermined minimum host hardware specification criteria, and thereby facilitate registration of one or more host systems 140 across a distributed geography. These registered host systems 140 may be made available to any of the client devices 110. As described herein, it should be appreciated that host system 140A made available to the client devices 110A may be the candidate host system that is available, has the requisite computing capabilities, and is closest in geographical proximity to the client device 110A.

Also as described in more detail below, to facilitate establishment of a connection over the network 120 between one of the client devices 110 (e.g., the client device 110A) and at least one of the selected host systems (e.g., the host system 140A), the processor 101, as instructed by the memory 102 storing instructions, may receive a host connection request from the client device 110A to establish a connection with the selected host system 140A. The processor 101 may then receive a host connection acceptance from the selected host system 140A. It should be appreciated that in the event the selected host system 140A is unavailable for at least a duration of time specified in the host connection request from the client device 110A, the processor 101 may provide to the client device 110A at least one alternative host system recommendation, which in some examples, may be based on the host registration data, the client registration data, and/or other information available to the processor 101. The processor 101 may then receive, from the client device 110A, an alternative host system selection. In some examples, a user of the client device 110A may make the host system selection. In some examples, the processor 101 may provide the host system selection automatically based on the host registration data, the client registration data, and/or other information available to the processor 101. For example, the processor 101 may make the host system selection based on computing hardware of the host system and/or preferences of a user of the client device 110A, all of which may be found in the host registration data, the client registration data, and/or other information available to the processor 101.

Accordingly, the system 100 may enable any number of client devices 110 registered with the system 100 to interact with interactive entertainment or other digital media content (such as video games) hosted by any of the host systems 140 registered with the system 100. In this way, the client devices 110 may or may not have to connect to host systems located within a data center, which may be physically and/or geographically far from any of the client devices 110, reducing or obviating the latency issues described above. Details of the system 100 and its operation within the system environment 150 will be described in more detail below.

It should be appreciated that the processor 101 may be a semiconductor-based microprocessor, a central processing unit (CPU), an application specific integrated circuit (ASIC), a field-programmable gate array (FPGA), and/or other suitable hardware device. In some examples, the memory 102 may have stored thereon machine-readable instructions 103-106 (which may also be termed computer-readable instructions) that the processor 101 may execute. The memory 102 may be an electronic, magnetic, optical, or other physical storage device that contains or stores executable instructions. The memory 102 may be, for example, Random Access memory (RAM), an Electrically Erasable Programmable Read-Only Memory (EEPROM), a storage device, an optical disc, and the like. The memory 102, which may also be referred to as a computer-readable storage medium, may be a non-transitory machine-readable storage medium, where the term "non-transitory" does not encompass transitory propagating signals.

Each of the client devices 110 may be a computing device that may transmit and/or receive data via the network 120. In this regard, each of the client devices 110 may be any device having computer functionality, such as a smartphone, a tablet, a laptop, a watch, a desktop, a server, or other computing device. In some examples, the client devices 110 may be mobile devices that are communicatively coupled to the network 120 and enabled to stream interactive entertainment via the network 120. Because many mobile devices are low-power devices, it should be appreciated that the client devices 110 may experience reduced latency when streaming or interacting with interactive entertainment or other digital media content, such as video games, from the host systems 140 are geographically closer to the client devices 110.

In some examples, the client devices 110 may execute an application allowing a user of the client devices 110 to interact with various elements on the network 120. For instance, the client devices 110 may receive data from user input, a database, a file, a web service, and/or via an application programming interface (API). Additionally, client devices 110 may execute a browser or application to enable interaction between the client devices 110 and the system 100 via the network 120. For example, a user may interact with a mobile application or a web application, executing via a browser, in order to play a video game or interact with other interactive entertainment or digital media content via the network 120. In an example, the client devices 110 may interact with the system 100 through application programming interfaces (APIs) running on a native or remote operating systems of the client devices 110. Other various examples may also be provided.

According to examples, the client devices 110 may include software for facilitating streaming video games or other interactive entertainment. For instance, the client devices 110 may have access to or include data associated with streaming video games or other interactive entertainment usually hosted on other network elements, such as the system 100, external system 130, and/or third-party host systems 140. Although one or more portions of the system 100, external system 130, and/or third-party host systems 140 may reside at a network centric location, as shown, it should be appreciated that any data or functionality associated with the system 100, the external system 130, the third-party host systems 140, and/or other network element may also reside locally, in whole or in part, at the client devices 110, or at some other computing device communicatively coupled to the client devices 110.

The network 120 may be a local area network (LAN), wide area network (WAN), the Internet, a cellular network, a cable network, a satellite network, or other network that facilitates communication between the client devices 110, the external system 130, the system 100, and/or any other system, component, or device connected to the network 120. The network 120 may further include one, or any number, of the exemplary types of networks mentioned above operating as a stand-alone network or in cooperation with each other. For example, the network 120 may utilize one or more protocols of one or more clients or servers to which they are communicatively coupled. The network 120 may facilitate transmission of data according to a transmission protocol of any of the devices and/or systems in the network 120. Although the network 120 is depicted as a single network in FIG. 1B, it should be appreciated that in some examples, the network 120 may include a plurality of interconnected networks as well.

The external system 130 may be communicatively coupled to the network 120. In some examples, the external system 130 may be a third-party website, or any content or data source, that provides content or data to the client devices 110, the host systems 140, and/or the system 100. In some examples, the external system 130 may be a data center with servers and/or host systems for provisioning interactive entertainment or digital media content, such as video games or other interactive entertainment, to the client devices 110, the host systems 140, the system 100, and/or other network elements (not shown) in the system environment 150. In some examples, the external system 130 may include one or more application servers that host various applications for the client devices 110, the host systems 140, the system 100, and/or other network elements.

Each of the host systems 140 may be a computing device that may transmit and/or receive data via the network 120. In this regard, each of the host systems 140 may be any device having computer functionality, such as a smartphone, a tablet, a laptop, a watch, a desktop, a server, or other computing device. In some examples, the host systems 140 may include any number of high-performing computing hardware, that when communicatively coupled to the network 120 and registered with the system 100 as candidate host systems, may be enabled to host, via the network 120, interactive entertainment or digital media content, such as video games, for remote game play at one or more client devices 110. Because many of the client devices 110 may be low-power mobile devices, establishing a connection with the host systems 140 may enable client devices 110 to experience reduced latency when the host systems 140 are hosting interactive entertainment or other digital media content, such as video games, on behalf of the client devices 110.

In some examples, the host systems 140 may be computing hardware owned by users, who elect to have their computing hardware function as third-party host systems. Accordingly, the host systems 140 may include and execute an application allowing a user of the host systems 140 to interact with various elements on the network 120. For instance, the host systems 140 may receive data from user input, a database, a file, a web service, and/or via an application programming interface (API). Additionally, the host systems 140 may execute a browser or application to enable interaction between and with the client devices 110 and/or the system 100 via the network 120. For example, users may interact with an application on the host systems 140, in order to register their respective computing hardware and to make their computing hardware available as a host to one or more client devices 110 (e.g., to play a video game or other interactive entertainment or digital media content hosted by the computing hardware via the network 120). In an example, the host systems 140 may interact with the system 100 through application programming interfaces (APIs) running on a native or remote operating systems of the host systems 140. Other various examples may also be provided.

FIGS. 2A-2D illustrate geographic diagrams 200A-200D for providing low latency interactive media distribution using shared user hardware, according to an example. As shown in each of these geographic diagrams 200A-200D, there may be a limited number of data centers 210 spread over a particular geography 220 (e.g., the United States). Each of the data centers 210 depicted may include any number of host systems and/or servers, as described above. For the purposes of illustration, each of the data centers 210 depicted in FIGS. 2A-2D are shown only with servers, and without host systems collocated with these servers, in order to demonstrate the approaches described herein. For example, even though the data centers 210 may be limited in number, there may be a large number of client devices 110 and host systems 140 distributed throughout the geography 220. As described with respect to FIGS. 1A-1B, these host systems 140 may be high-performing computing hardware owned by various users that elect to have their high-performing computing hardware registered with the system 100 as candidate host systems to serve and function as third-party host systems.

Figure 2A:
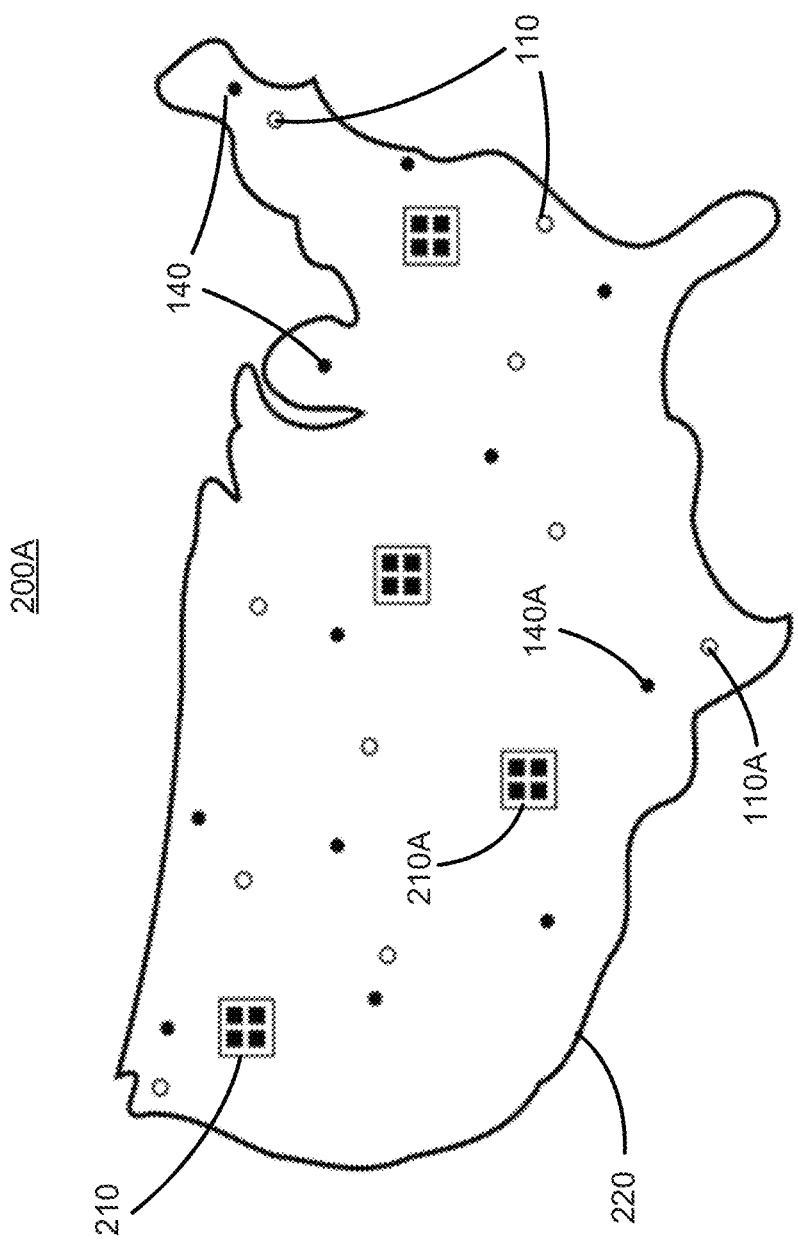
FIGS. 2A-2D illustrate geographic diagrams of a system for providing low latency interactive media distribution using shared user hardware, according to an example.

FIG. 2A illustrates a geographic diagram 200A for providing low latency interactive media distribution using shared user hardware, according to an example. As shown in the geographic diagram 200A, the client device 110A may be a low-power mobile device, such as a smartphone. A user of the client device 110A may intend to stream and interact with interactive entertainment or other digital media content, such as a video game, on the client device 110A. However, the client device 110A may be geographically far from the nearest data center 210A (or other data centers 210), e.g., more than about 100 miles or more. As a result, in the event the data center 210A was selected to provision and host the video game on behalf of the client device 110A, the user of the client device 110A may experience latency issues especially if the video game selected requires a high level of processing power or speed. The user on the client device 110A may experience limited game play in this scenario.

On the other hand, the system 100, as described earlier with respect to FIGS. 1A-1B, may allow the client device 110A of FIG. 2A, for example, to search for and/or establish a connection with a geographically-closer host system 140A, which may include high-performing computing hardware owned by another user (e.g., owner of the high-performing computing hardware). This owner, in this case, may desire to offer to share his or her high-performing computing hardware and have the high-performing computing hardware registered at the system 100 to serve and function as a third-party host system, decentralized from the data center 210A. Because the host system 140A may be much closer, physically and geographically, to the client device 110A, streaming and interacting with the video game (or other interactive media) hosted by the much-closer host system 140A may reduce latency and improve performance relative to streaming and interact with similar content from the data center 210A.

In some examples, the host system 140A may be offered for use to the client device 110A in return for a financial payment. The system 100, as described herein, may set a pricing structure (e.g., tiers), which may be based on a variety of pricing factors, such as hardware specifications, host system ratings, user ratings, host system schedule and availabilities, etc. Other various scenarios may also be provided.

Figure 2B:
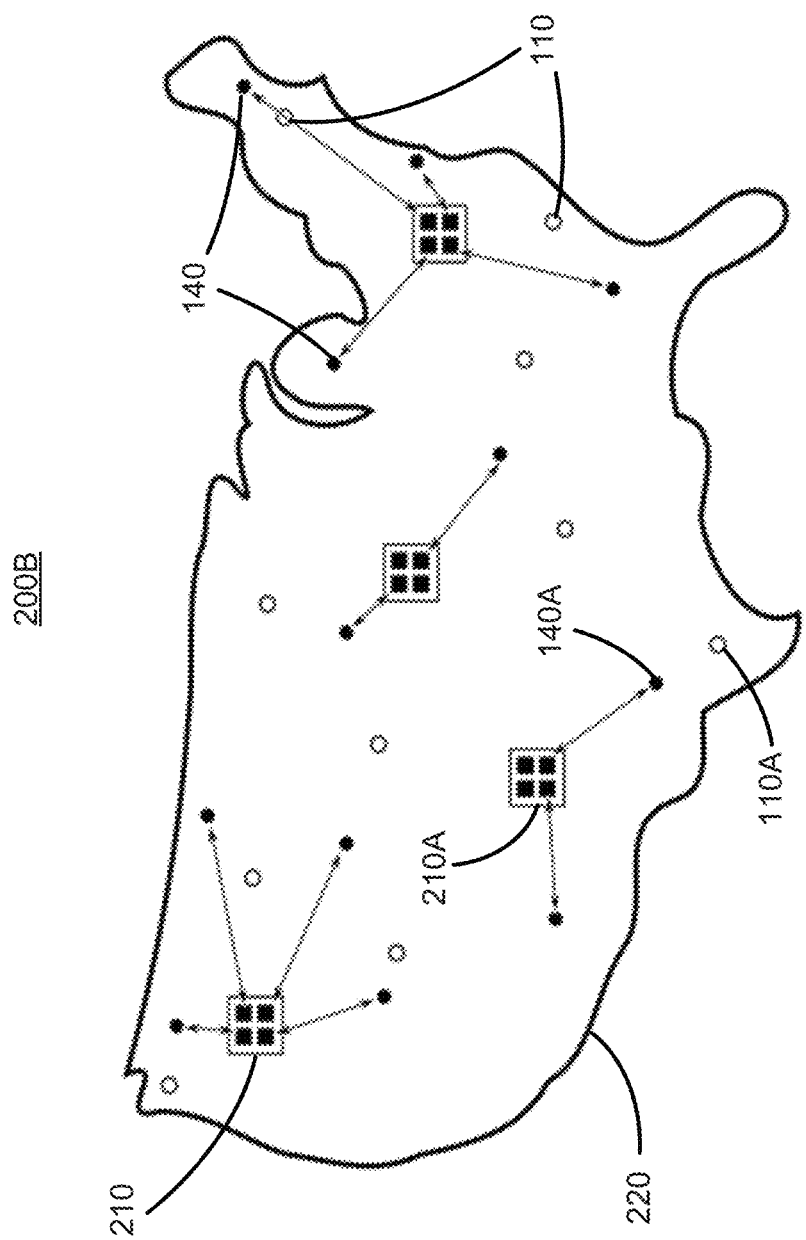

In order to provide low latency interactive media distribution using shared user hardware, the owner of the host system 140A may first register the host system 140A with the data center 210A, as shown in a geographic diagram 200B of FIG. 2B. It should be appreciated that the data center 210A may include system 100 of FIGS. 1A-1B for the purposes of this example. Accordingly, all the host systems 140 depicted in FIG. 2B may be registered as candidate host systems with system 100 at the data centers 210, as shown by the arrows. The registration process may involve the system 100 receiving host registration data of the host systems 140 (e.g., from the host systems 140 or other source). In some examples, the registration process may be a continuous process, where the system 100 and the host systems 140 may exchange updated host registration data and/or other relevant data for provisioning low latency interactive media distribution.

In some examples, the host registration data may include host hardware specification data. This may include computing hardware specifications, such as processing power and/or speed, memory capacity, hard disk size, date of manufacture or assembly, and/or other performance capabilities. In this way, the system 100 may determine whether any of the host systems 140 meet minimum hardware or network speed capabilities. The hardware specification data may also include a device identifier, such as a serial number, a MAC address, or other identifier. It should be appreciated that the hardware specification data may also be benchmarked or measured. This may be achieved by various hardware or software components reside at the host systems 140 or other systems/components (e.g., system 100) via the network. In some examples, the host registration data may include geographic location data, such as global positioning system (GPS) coordinates, IP address, or other location identifier.

In some examples, the host registration data may include host system availability data. This may include a schedule of availability or non-use provided by a user or owner of each of the host systems 140. In some examples, the schedule may be determined based on user history, time zones, behavioral patterns, etc. The schedule may also be determined automatically based on these and/or other factors. In some examples, the host registration data may include host system owner profile data as well. This host system owner profile data may include personal information, financial information, preferences, peer reviews, and/or other information about the owner of the shared computing hardware. It should be appreciated that this data may be subject to one or more privacy policies set forth below.

For the system 100 to register any of the host systems 140 as candidate host systems, certain criteria may need to be met. For example, the system 100 may register only those host systems 140 that may have a certain level of hardware performance capabilities. In other words, the host hardware specification data may need to meet certain predetermined minimum host hardware specification criteria in order for the associated host systems 140 to be registered. In some examples, the predetermined minimum host hardware specification criteria may be based on the interactive entertainment or digital media content itself. For example, in the event the interactive entertainment or digital media content desired to be accessed by the user of the client device 110A may require a certain minimum amount of processing capabilities, the system 100 may establish a threshold that allows those host systems 140 that meet the requisite performance requirements to be presented for use as candidate host systems by the client device 110A. In some examples, these requisite performance requirements may include hardware computing capabilities, minimum network speed, duration of availability for shared use, owner profile or preferences, as well as other requirements, such as user ratings, recommendations, pricing factors, etc. Other various factors may also affect or adjust the threshold or registration criteria. It should be appreciated that once any of the host systems 140 is registered, it may receive and/or install a software application, which may enable communications for the host systems 140 to other network elements in the network 120. For example, the software application may facilitate communications associated with updated host registration data, interactive entertainment or digital media content, and/or establishment of connection to registered client devices 110.

Although not depicted, the data centers 210 may also include registered host systems, which may also be accessed by the client devices 110. However, for the purposes of illustration, namely to show the distributed nature of the approaches described herein, the data centers 210 may not include such host systems in these examples.

Figure 2C:
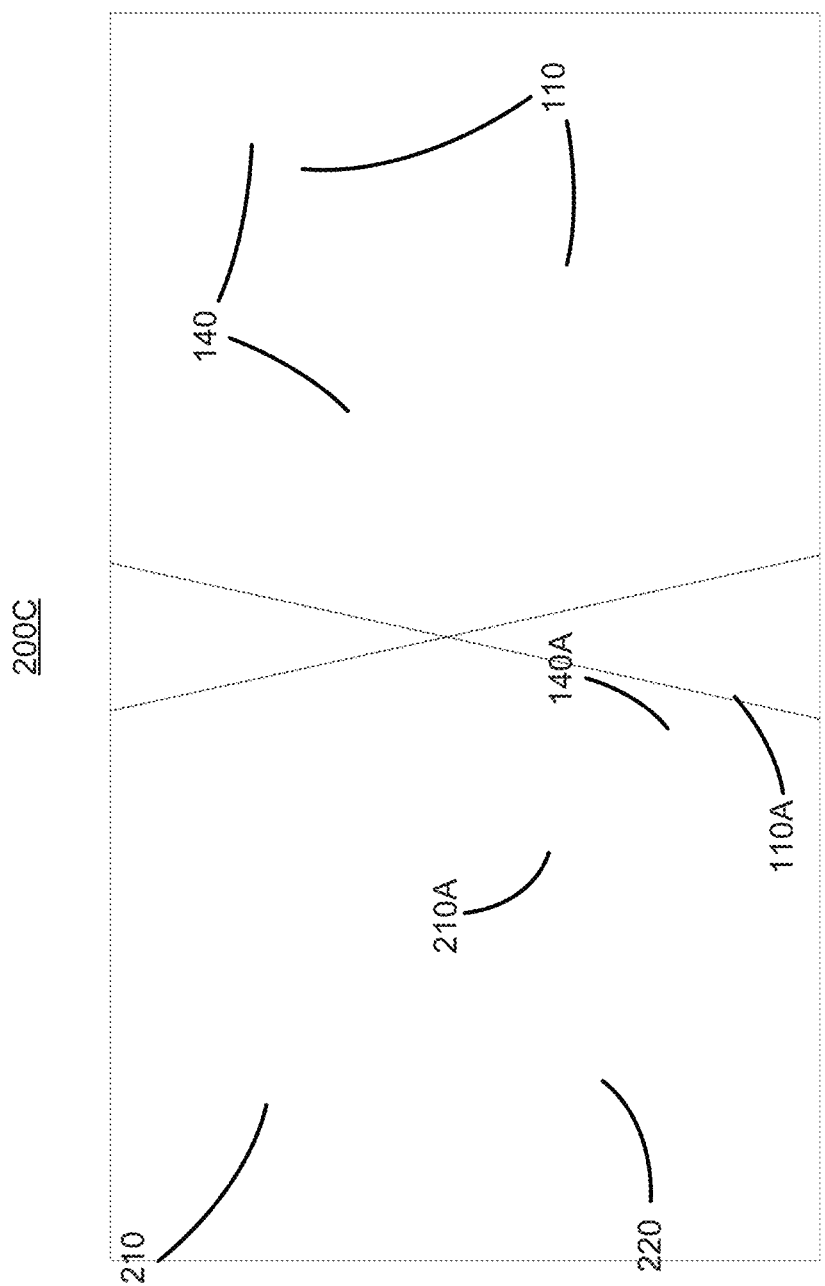
Figure 2D:
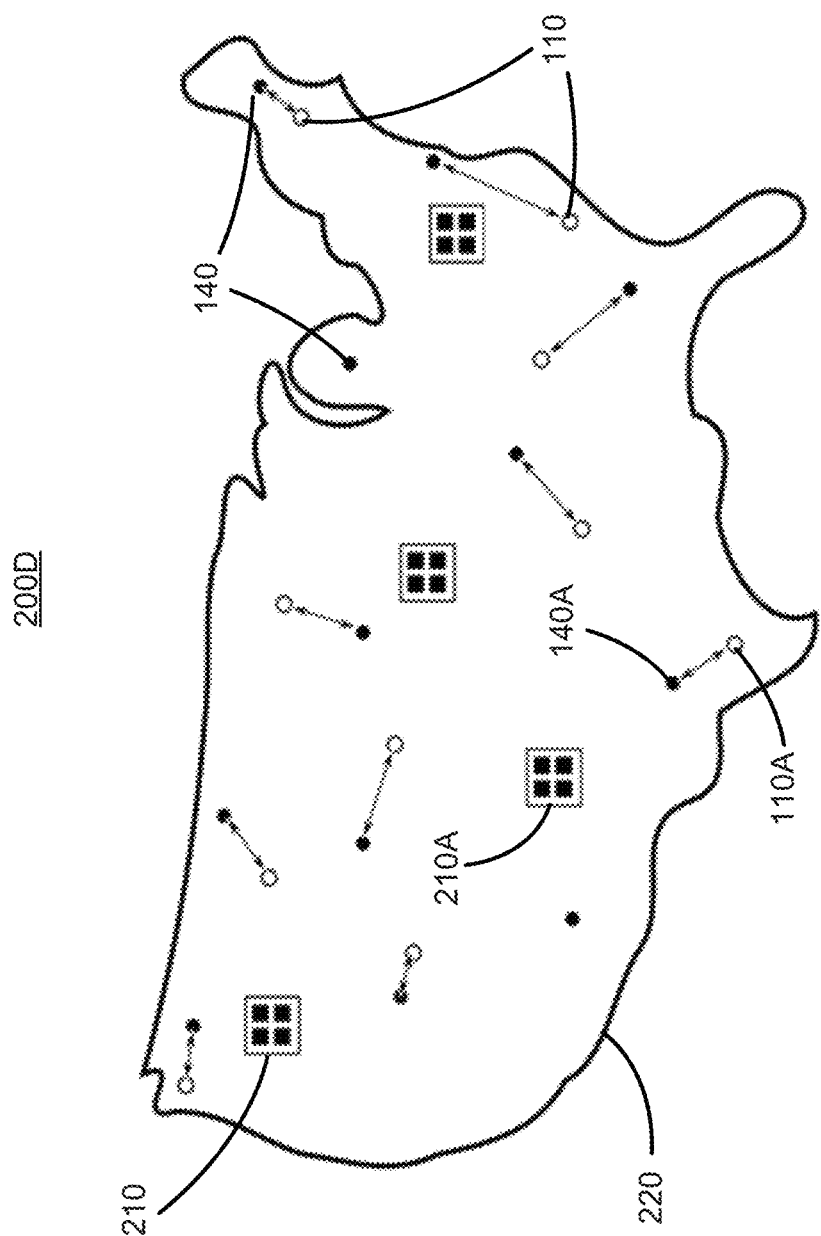

Assuming all the host systems 140 depicted in FIGS. 2A-2D are registered as candidate host systems, the client devices 110 may also register with the system 100, as shown in a geographic diagram 200C of FIG. 2C. Similar to the registration process for the host systems 140 in FIG. 2B, users of the client devices 110 may also register their client devices 110 using a similar registration process. For example, all the client devices 110 depicted in FIG. 2C may be registered with system 100 at the data centers 210, as shown by the arrows. The registration process may involve the system 100 receiving client device registration data from a plurality of client devices 110. In some examples, the registration process may be a continuous process, where the system 100 and the client devices 110 may exchange updated client device registration data and/or other relevant data for provisioning low latency interactive media distribution.

In some examples, the client device registration data may include client device hardware specification data, client device performance data, geographic location data, client device user profile data, or other information. In some examples, the client device hardware specification data may, for example, include computing hardware specifications, such as processing power and/or speed, memory capacity, hard disk size, date of manufacture or assembly, and/or other performance capabilities. The client device hardware specification data may also include device identifier, such as a serial number, a MAC address, or other identifier.

Similar to the host system, the geographic location data for the client device may include geographic location data, such as global positioning system (GPS) coordinates, IP address, or other location identifier.

In some examples, the client device performance data may also include information associated to current or historical network connectivity strength or latency data. It should be appreciated that network connectivity strength or latency may depend on various factors, such as hardware specifications, location, available local or wide area networks, etc. Applications residing at the client devices 110 and/or at the system 100 may enable, monitor, and/or report the client device performance data. In some examples, the client device performance data may be continuously monitored in real-time or near real-time. In this way, the system 100 may determine what capabilities can be expected at the client devices 110 and/or what host system recommendations to provide. Furthermore, these applications may help registered client devices 110 communicate with registered host systems 140, publishers of interactive entertainment or digital media content (e.g., external system 130), the system 100, or any other network component in the network 120.

The client device user profile data may include user information, financial information, user preferences, peer reviews, and/or other information about the users of any of the client devices 110. Similar to the host system owner profile data, it should be appreciated that the client device user profile data may also be subject to one or more privacy policies set forth below.

When the host systems 140 and the client devices 110 are registered with the system 100, the client devices 110 may then be able to connect with the host systems 140 to access, stream, or interact with interactive entertainment or digital media content hosted by the shared hardware provided by the host 140. As shown in the geographic diagram 200D of FIG. 2D, the system 100 may facilitate establishment of a connection (e.g., P2P) between client device 110A and the host system 140A, as shown by the arrows. It should be appreciated that while P2P connections are depicted and described, other various connections or communicative coupling may also be provided.

As mentioned above, in order to establish this connection between the client device 110A and the host system 140A, the system 100 may further receive a host connection request from the client device 110A to establish a connection with the selected host system 140A. In some examples, this may include the system 100 providing a search function for the user of the client device 110A. This search function may allow the user to select or choose various interactive entertainment or digital media content and/or define desired processing needs. In some examples, system 100 may also receive a host connection acceptance from the selected host system 140A in order to facilitate establishment of a connection over the network 120 between the client device 110A and the selected host system 140A to cause the selected host system 140A to host the interactive media on behalf of the client device 110A and for the client device 110A to interact with the interactive media hosted on the selected host system 140A.

In some examples, the system 100 may provide, to the client device 110A, host system recommendation from the registered host systems 140. For instance, the system 100 may recommend to the client device 110A that the host system 140A to be the third-party host system it should connect to because it is physically and geographically the closest and may have computing hardware that meets or exceeds any predetermined criteria desired by the user of the client device 110A. The system 100 may recommend host system 140A or any other host system from the registered host systems 140 based on the host registration data, the client registration data, and/or other information accessible to the system 100.

In some examples, an owner of the third-party host system 140A may submit a payment (financial payment, reward credit, or other remittance) for his or her computing hardware to be recommended by the system 100. For example, there may be a tiered membership status for third-party hosts. In some examples, the recommendation of host systems 140 may be based on user preference, historical performance, pricing, feedback-based reviews by prior users, or other information.

Figure 3:
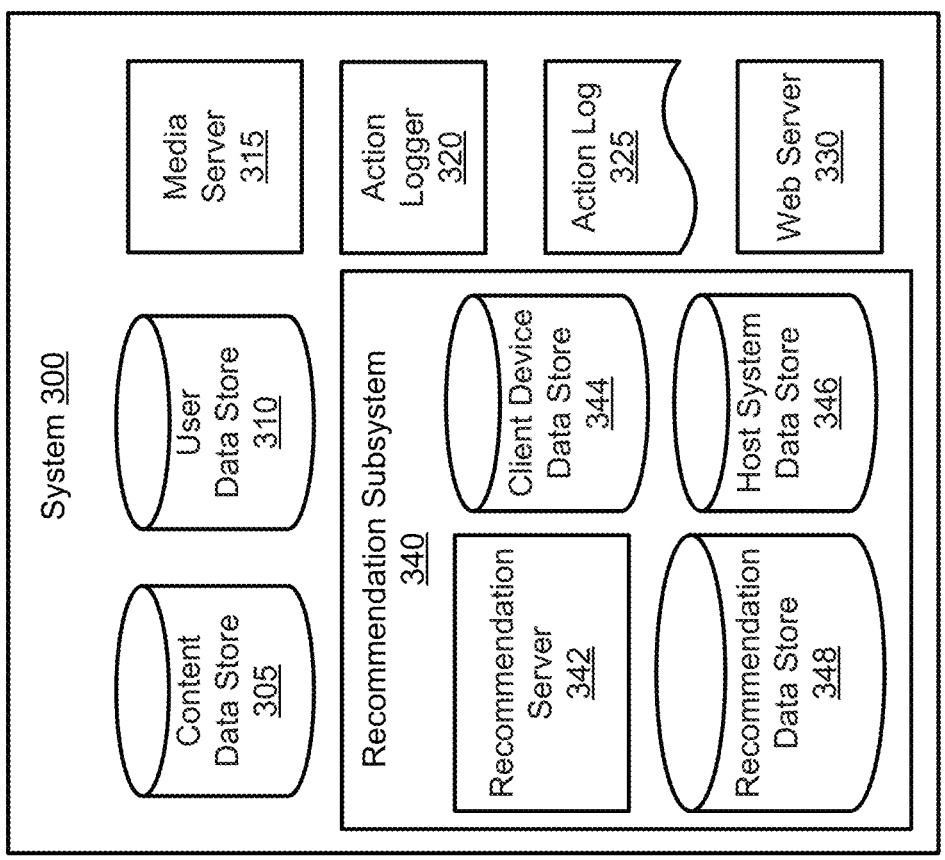
FIG. 3 illustrates a block diagram of the system for providing low latency interactive media distribution using shared user hardware, according to an example.

FIG. 3 illustrates a block diagram of a system 300 for providing low latency interactive media distribution using shared user hardware, according to an example. It should be appreciated that the system 300 may be similar to the system 100 as described with respect with FIGS. 1-2, but the system 300 may be described with more specificity and/or with examples of additional capabilities and features that may or may not be a part of system 100. In some examples, the system 300 may be an online system having a recommendation subsystem 340 to help facilitate various client device and host system registrations as well as provide third-party host system recommendations for any number of client devices 110. As shown, the system 300 may include a content data store 305, a user data store 310, a media server 315, an action logger 320, an action log 325, and a web server 330.

The content data store 305 may store a variety of content associated with provisioning interactive entertainment or digital media content as described herein. This may involve content associated with analyzing and evaluating registration of client devices and/or host systems, identifying performance requirements associated with interactive entertainment or digital media content, etc. For example, performance information associated with interactive entertainment or digital media content may include data associated with speed of processing, such as performance capabilities that may be affected by hardware, software, or network, or other elements. In some examples, pricing information associated with shared user hardware may also be stored at the content data store 305.

The user data store 310 may also store, among other things, data associated with users. This data may include user profile information directly provided by a user or inferred by the system 300. Examples of such information may include biographic, demographic, pictorial, and/or other types of descriptive information, such as employment, education, gender, hobbies, preferences, location, etc. It should be appreciated that any personal information that is acquired may be subject to various privacy settings or regulations, as described below.

The media server 315 may be used, among other things, to gather, distribute, deliver, and/or provision various media content, e.g., stored in the content data store 305 or elsewhere. The media server 315 may be used by system 300 to coordinate with the external system 130 of FIG. 1B, for example, which may be a data center or a publisher of various interactive entertainment or digital media content.

The system 300 may also include an action logger 320, an action log 325, and a web server 330. In some examples, the action logger 320 may receive communications about user actions performed on or off the system 100, and may populate the action log 325 with information about various user actions. Such user actions may include, for example, adding a connection to another user or entity, sending a message from another user or entity, viewing content associated with another user or entity (such as another user or an advertisement), initiating a payment transaction, etc. In some examples, the action logger 320 may receive, subject to one or more privacy settings or rules, content interaction activities associated with another user or entity. In addition, a number of actions described in connection with other objects may be directed at particular users, so these actions may be associated those users as well. Any or all of these user actions may be stored in the action log 325.

The system 100 may use the action log 325 to track user actions on the system 100 or other external systems. The action log 325 may also include context information associated with context of user actions. For example, such content information may include date/time an action is performed, other actions logged around the similar date/time period, or other associated actions. Other context information may include user action patterns, patterns exhibited by other similar users, or even various interactions a user may have with any particular or similar object. These and other similar actions or other similar information may be stored at the action log 325 and may be used for providing third-party host system recommendations during provisioning of low latency interactive entertainment or digital media content, such as video games, as described herein.

The web server 330 may link the system 300 via a network (e.g., network 120 of FIG. 1B) to one or more client devices (e.g., client devices 110 of FIG. 1B). The web server 330 may serve web pages, as well as other web-related content, such as Java, Flash, XML, or other similar content. The web server 330 may communicate with various internal elements of the system 300 or external network components to provide various functionalities, such as receiving, transmitting, and/or routing content between the system 300, client devices, and other network components.

As described herein, the system 300 may also include the recommendation subsystem 340. The recommendation subsystem 340 may employ one or more techniques to help define, modify, track, schedule, execute, compare, analyze, evaluate, and/or deploy one or more applications for registration services of the system 300. In some examples, the recommendation subsystem 340 may also employ any variety of techniques to provide third-party host system recommendations, for instance, using information provided during registration of client devices 110 and host systems 140. In some examples, the recommendation subsystem 340 may include a recommendation server 342, a client device data store 344, a host system data store 346, and a recommendation data store 348.

In particular, the recommendation server 342 of the recommendation subsystem 340 may enable the system 300 to provide any number of third-party host system recommendations to registered client devices 110, as discussed herein. Specifically, the recommendation server 342 may, in some examples, analyze, evaluate, examine, and/or update the client device registration data, the host system registration data, and/or the interactive entertainment or digital media content. Based on these assessments, the recommendation server 342 may identify and/or recommend various third-party host systems for the client devices 110 to establish a connection for streaming or interacting with interactive entertainment or digital media content.

The recommendation subsystem 340 may use the client device data store 344 to store content associated with registered client devices 110, the host system data store 346 to store content associated with registered host systems 140, and the recommendation data store 348 to store content associated with registration data and/or any information derived from such registration data, such as recommendation data, historical data, etc.

Although not depicted, it should be appreciated that system 300 may also include various artificial intelligence (AI) based machine learning tools to help provide third-party host system recommendations. For example, these AI-based machine learning tools may be based on optimization of different types of content analysis models, including but not limited to, algorithms that analyze transactions and host system capabilities and other details to provide relevant third-party host system recommendations. For instance, these AI-based machine learning tools may be used to generate models and/or classifiers that may include a neural network, a tree-based model, a Bayesian network, a support vector, clustering, a kernel method, a spline, a knowledge graph, or an ensemble of one or more of these and other techniques. These AI-based machine learning tools may further generate a classifier that may use such techniques. The recommendation subsystem 340 may periodically update the model and/or classifier based on additional training or updated data associated with the system 300. It should be appreciated that the recommendation subsystem 340 may vary depending on the type of input and output requirements and/or the type of task or problem intended to be solved. The recommendation subsystem 340, as described herein, may use supervised learning, semi-supervised, and/or unsupervised learning to build the model using data in the training data store. Supervised learning may include classification and/or regression, and semi-supervised learning may require iterative optimization using objection functions to fill in gaps when at least some of the outputs are missing. It should also be appreciated that the recommendation subsystem 340 may provide other types of machine learning approaches, such as reinforcement learning, feature learning, anomaly detection, etc.

In some examples, the system 300 may provide a manual mode of operation, where a user may narrow down selection with limited or without use of the recommendation subsystem 340. For instance, the user may search for third-party host systems 140 by a sorting feature, as follows: Content Type>Category>Sort by Name>Sort Available Hosts Within 100-Mile Radius by Latency>Sort by Host Tier. In some examples, the system 300 may provide a search feature that may use natural language processing (NLP) or other similar search function to accept user search inputs. In this way, a user may be presented with a list of recommendations, but may use the search feature to refine his or her search. For example, as the user types his or her desired interactive entertainment content and/or host systems, etc., the list of recommendations may be continuously and/or automatically refined based on the user's input. For example, if the user enters "S" into the search feature, the recommendation subsystem 340 may narrow the list of recommendations to those the media content or host systems 140 that begin with the letter "S." If the user continues typing the user search input and enters "Super" into the search feature, the recommendation subsystem 340 may narrow the list of recommendation to ones that begin or have the word "Super." Other various similar or different features may also be provided.

It should be appreciated that classification algorithms may provide assignment of instances to pre-defined classes to decide whether there are matches or correlations. Alternatively, clustering schemes or techniques may use groupings of related data points without labels. Use of knowledge graphs may also provide an organized graph that ties nodes and edges, where a node may be related to semantic concepts, such as persons, objects, entities, events, etc., and an edge may be defined by relations between nodes based on semantics. It should be appreciated that, as described herein, the term "node" may be used interchangeably with "entity," and "edge" with "relation." Also, techniques that involve simulation models and/or decision trees may provide a detailed and flexible approach to providing third-party host system recommendations associated with providing low latency interactive media distribution using shared user hardware, as described herein.

It should be appreciated that the systems and subsystems shown herein, as described herein, may include one or more servers or computing devices. Each of these servers or computing devices may further include a platform and at least one application. An application may include software (e.g., machine-readable instructions) stored on a non-transitory computer-readable medium and executable by a processor. A platform may be an environment on which an application is designed to run. For example, a platform may include hardware to execute the application, an operating system (OS), and runtime libraries. The application may be compiled to run on the platform. The runtime libraries may include low-level routines or subroutines called by the application to invoke some behaviors, such as exception handling, memory management, etc., of the platform at runtime. A subsystem may be similar to a platform and may include software and hardware to run various software or applications.

While the processors, systems, subsystems, and/or other computing devices may be shown as single components or elements (e.g., servers), one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100 and/or 300.

Figure 4B:
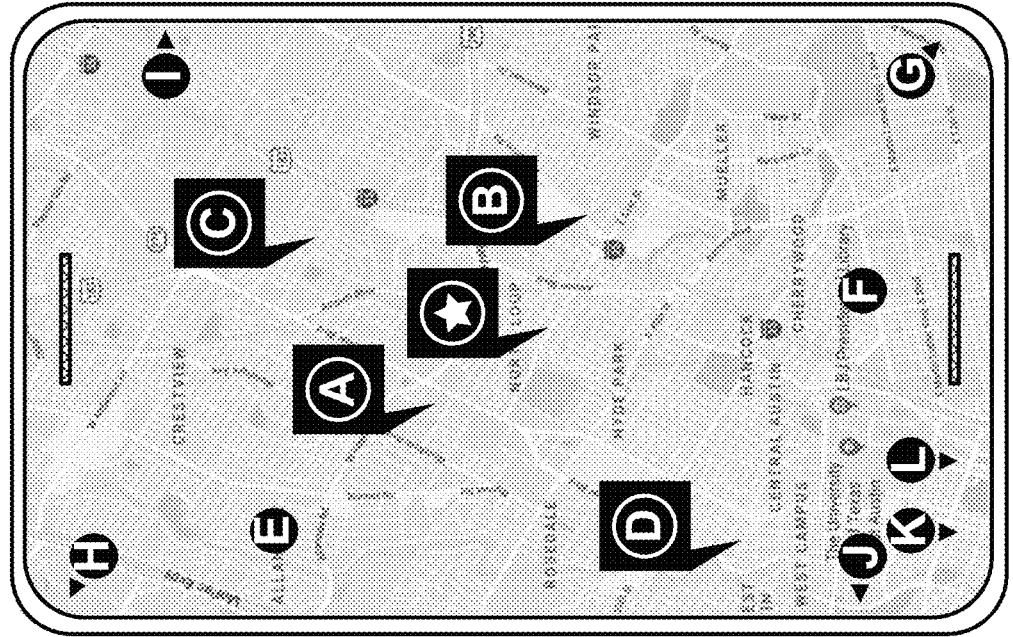
FIGS. 4A-4B illustrate screens of host system recommendations at a client device in an interactive video game environment, according to an example.
Figure 4A:
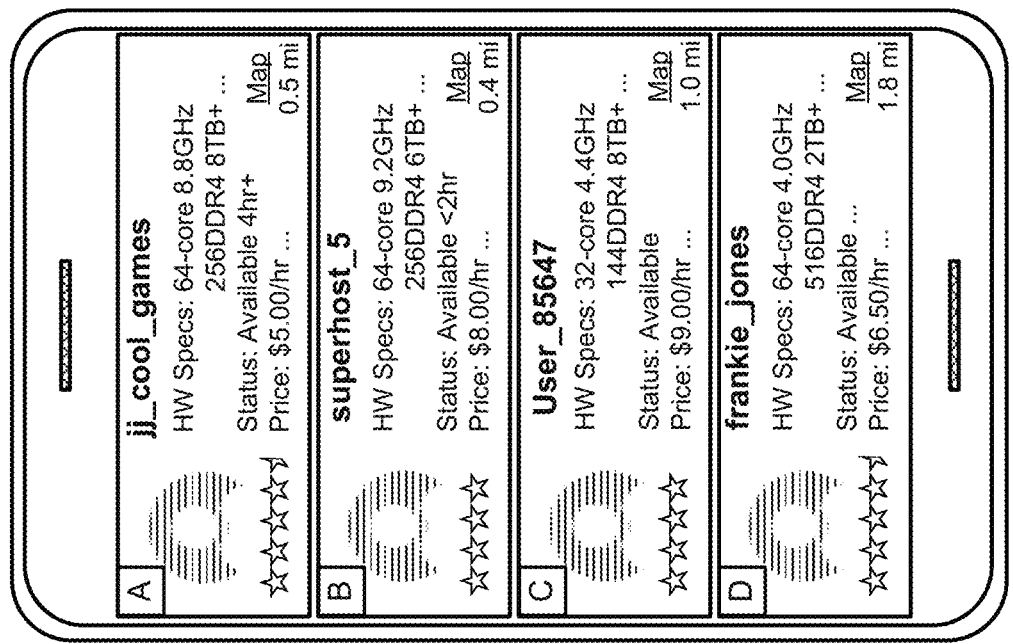

FIGS. 4A-4B illustrate screens 400A-400B of host system recommendations at a client device in an interactive video game environment, according to an example. In an interactive video game environment, for example, the recommendation subsystem 340 of system 300, as shown in FIG. 3, may employ any variety of techniques to provide third-party host system recommendations to a user at the client device 110A. For example, the recommendation subsystem 340 may collect, analyze, and/or process information from the registration of client devices 110 and host systems 140, as well as various video gaming requirements, user preferences, historical data, user ratings, etc. In this way, recommendation subsystem 340 may generate one or more third-party host system recommendations for the user of the client device 110A seeking to play an interactive video game hosted by an available host system.

As shown in screen 400A of FIG. 4A, a list of recommendations may be provided at the client device 110A. For example, there may be four (4) registered third-party host system recommendations, as shown in screen 400A. These may include, among others, the following third-party host system owners: (A) "jj_cool_games," (B) "superhost_5," (C) "User 85647," and (D) "frankie_jones." Each of these recommendations (A)-(D) may include a user (or owner/host) name or other identifier, a profile picture, a user/customer rating, any number of hardware specifications, a status indicator (e.g., availability and/or duration of availability), price or cost to use the shared hardware, as well as any other information about the recommended host system and/or owner of the recommended host system. In some examples, there may also be a distance indicator, as shown in the screen 400A. The distance indicator may inform the user of the client device 110A, for instance, how far (geographically) the recommended third-party host system is from the client device 110A. As described herein, the host systems nearest to the client device 110A may typically provide least amount of latency. However, it should be appreciated that geography may not be the only metric used to provide the recommendations.

For example, the list of recommendations (A)-(D) shown in screen 400A may list only those that have a 4-star user/customer rating or higher. In some examples, this may be based on preferences from the client device registration data, user profile associated with the client device 110A, or other source. As shown, recommendation (B), for instance, may be closer (0.4 miles) to the client device 110A than recommendation (A) (0.5 miles). The recommendation subsystem 340, however, may consider various factors, such as hardware specifications (slightly lower processing capability) based on video game hardware requirements, user ratings (half-star greater), price (cheaper), and availability (longer), and deduce and rank, in this particular scenario, recommendation (A) higher than recommendation (B). In some examples, the recommendation subsystem 340 may employ any of the recommendation techniques described above, and may vary depending on the specifications, preferences, and/or requirements associated with the client devices 110, the external system 130, the host systems 140, video games or other media, etc.

In some examples, the user of the client device 110A may also select a map view to view the list of recommendations, as shown in screen 400B of FIG. 4B. In the map view, the client device 110A may present a map of the local area having markers or identifiers of the client device (star), the list of recommendations (A)-(D), as well as other recommendations (E)-(L) that could be viable third-party host systems for the client device 110A. In some examples, the user of the client device 110A may navigate the recommendations in the map view to peruse these and other third-party host recommendations.

Once the user decides on a third-party host system to select, the user of the client device 110A may make his or her selection (e.g., selecting recommendation (A)) from either screen 400A or 400B, or other method. Once the selection is made, the system 300 may help facilitate establishment of a connection (e.g., P2P) over the network 120 between the client device 110A and the selected host system (e.g., host system 140A). In this way, the selected host system 140A may now host the video game (e.g., initially selected by the user) so that the user may play that video game on the client device 110A via the shared hardware of recommendation (A) "jj_cool_games."

Figure 5:
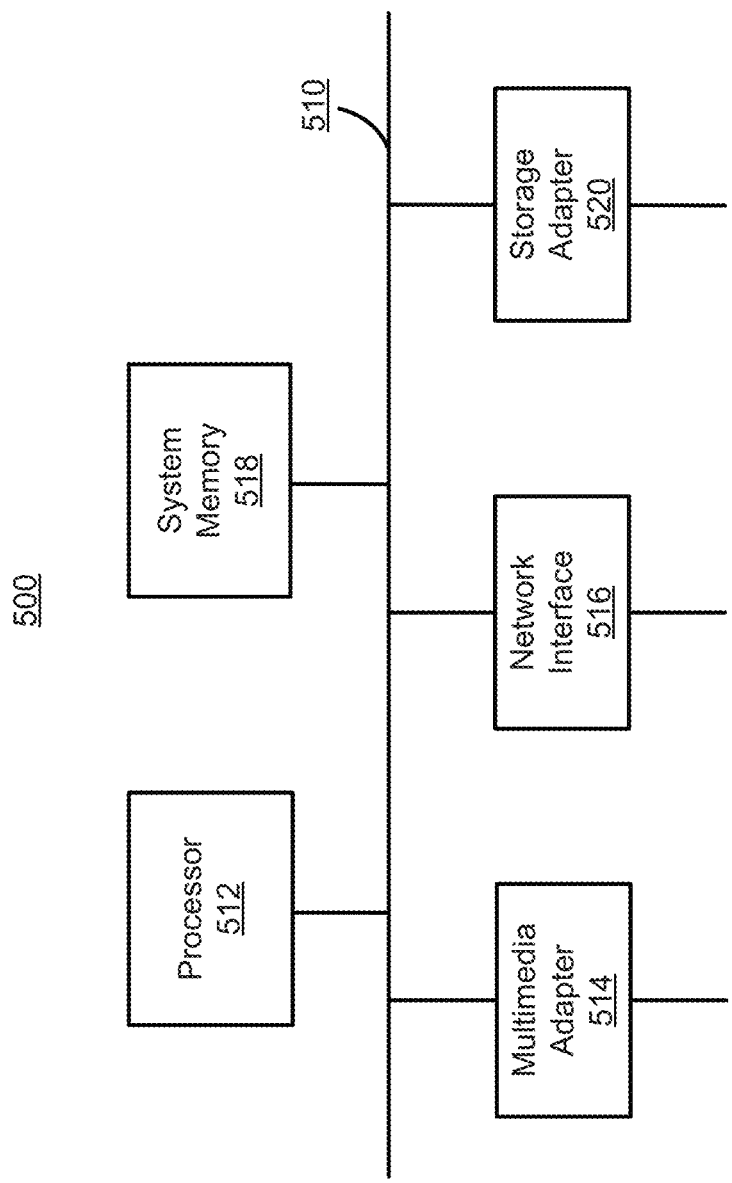
FIG. 5 illustrates a block diagram of a computer system for providing low latency interactive media distribution using shared user hardware, according to an example.

FIG. 5 illustrates a block diagram of a computer system 500 for providing low latency interactive media distribution using shared user hardware, according to an example. The computer system 500 may be part of or any one of the client devices 110, the external system 130, the host systems 140, and/or the system 100 and/or 300 to perform the functions and features described herein. The computer system 500 may include, among other things, an interconnect 510, a processor 512, a multimedia adapter 514, a network interface 516, a system memory 518, and a storage adapter 520.

The interconnect 510 may interconnect various subsystems, elements, and/or components of the computer system 500. As shown, the interconnect 510 may be an abstraction that may represent any one or more separate physical buses, point-to-point connections, or both, connected by appropriate bridges, adapters, or controllers. In some examples, the interconnect 510 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 510 may allow data communication between the processor 512 and system memory 518, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 512 may be the central processing unit (CPU) of the computing device and may control overall operation of the computing device. In some examples, the processor 512 may accomplish this by executing software or firmware stored in system memory 518 or other data via the storage adapter 520. The processor 512 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 514 may connect to various multimedia elements or peripherals. These may include a devices associated with visual (e.g., video card or display), audio (e.g., sound card or speakers), and/or various input/output interfaces (e.g., mouse, keyboard, touchscreen).

The network interface 516 may provide the computing device with an ability to communicate with a variety of remove devices over a network (e.g., network 120 of FIG. 1)

and may include, for example, an Ethernet adapter, a Fibre Channel adapter, and/or other wired- or wireless-enabled adapter. The network interface 516 may provide a direct or indirect connection from one network element to another, and facilitate communication and between various network elements.

The storage adapter 520 may connect to a standard computer-readable medium for storage and/or retrieval of information, such as a fixed disk drive (internal or external).

Many other devices, components, elements, or subsystems (not shown) may be connected in a similar manner to the interconnect 510 or via a network (e.g., network 120 of FIG. 1B). Conversely, all of the devices shown in FIG. 4 need not be present to practice the present disclosure. The devices and subsystems can be interconnected in different ways from that shown in FIG. 4. Code to implement the dynamic approaches for payment gateway selection and payment transaction processing of the present disclosure may be stored in computer-readable storage media such as one or more of system memory 518 or other storage. Code to implement the dynamic approaches for payment gateway selection and payment transaction processing of the present disclosure may also be received via one or more interfaces and stored in memory. The operating system provided on computer system 500 may be MS-DOS®, MS-WINDOWS®, OS/2®, OS X®, IOS®, ANDROID®, UNIX®, Linux®, or another operating system.

Figure 6:
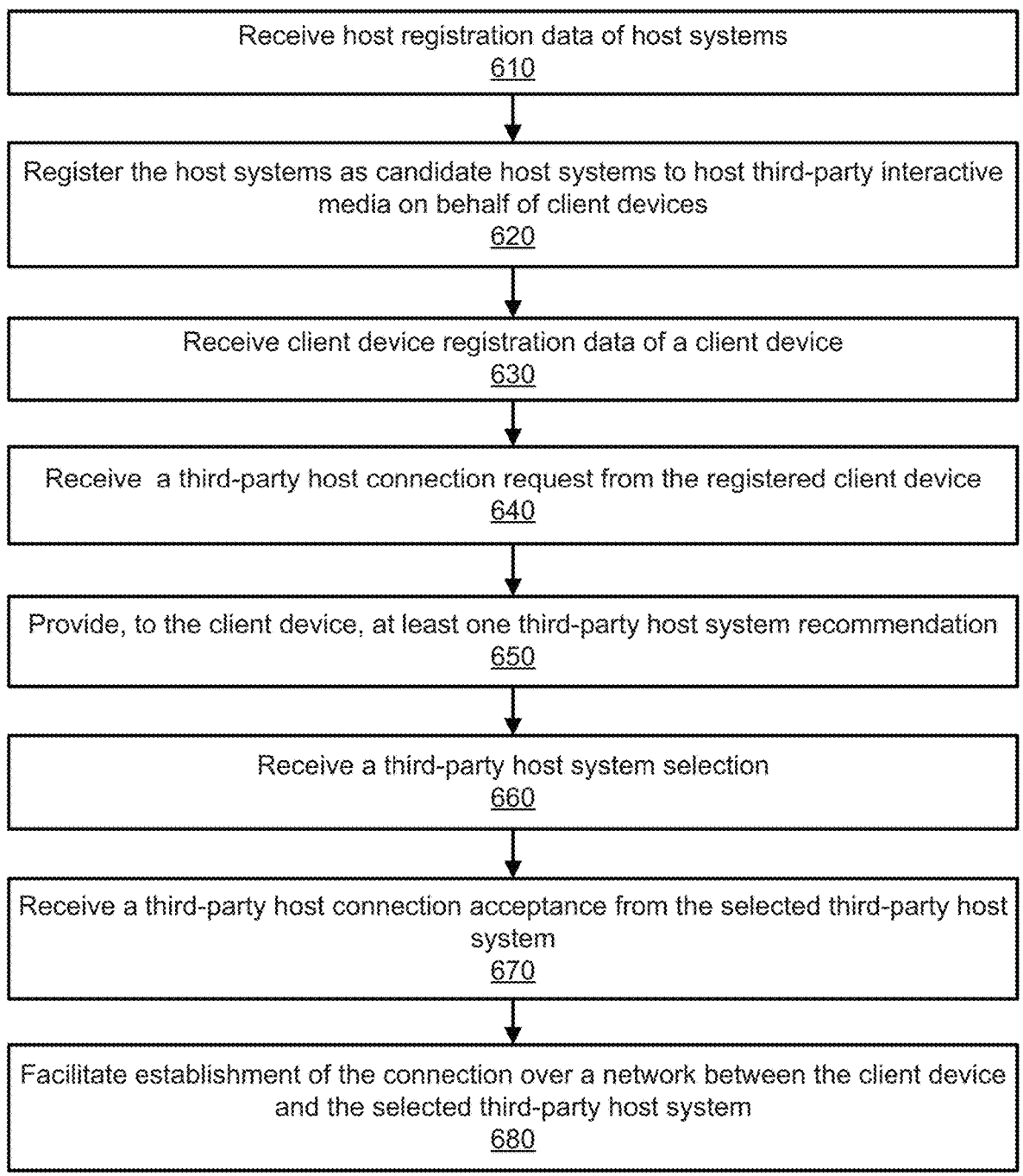
FIG. 6 illustrates a method for providing low latency interactive media distribution using shared user hardware, according to an example.

FIG. 6 illustrates a method 600 for providing low latency interactive media distribution using shared user hardware, according to an example. The method 600 is provided by way of example, as there may be a variety of ways to carry out the method described herein. Although the method 600 is primarily described as being performed by system 100 as shown in FIGS. 1, 2 and 3, or computer system 500 of FIG. 5, the method 600 may be executed or otherwise performed by other systems, or a combination of systems. Each block shown in FIG. 6 may further represent one or more processes, methods, or subroutines, and one or more of the blocks may include machine-readable instructions stored on a non-transitory computer-readable medium and executed by a processor or other type of processing circuit to perform one or more operations described herein.

At 610, the system 100 may receive host registration data of host systems, as described herein. In some examples, the host systems are third-party host systems situated across a distributed geography. In some examples, the host registration data may include host hardware specification data, geographic location data, host system availability data, host system owner profile data, and/or other data, as described herein.

At 620, the system 100 may register the host systems as candidate host systems to host third-party interactive media on behalf of client devices. As described herein, to register host systems as candidate host systems, the processor 101 may determine the candidate host systems that meet predetermined minimum third-party host system criteria. In some examples, the predetermined minimum host hardware specification criteria may be based on the interactive media, or other criteria.

At 630, the system 100 may receive client device registration data of a client device. In some examples, the client device registration data may include client device hardware specification data, client device performance data, geographic location data, client device user profile data, and/or other data, as described herein. In some examples, the client device user profile data may include client device user preferences and historical data. In some examples, the client device user profile data may include client device user preferences and historical data. In some examples, the client device performance data may include data associated with network connectivity strength and latency data.

At 640, the system 100 may receive a third-party host connection request from the registered client device. In some examples, this third-party host connection request may be to establish a connection with at least one of the registered host systems. In some examples, the third-party host connection request may be based on a search feature provided by the system 100 to the client devices 110.

At 650, the system 100 may provide, to the client device, in response to the third-party host connection request, at least one third-party host system recommendation. In some examples, the third-party host system recommendation may be based on the host registration data, the client registration data, and/or other data, such as the third-party interactive media requirements. In some examples, an AI-based machine learning technique may be used to help provide one or more third-party host system recommendations. In some examples, the third-party host system recommendations may be largely based on proximity (geographical location data) and hardware performance capabilities of the host systems. It should be appreciated that other factors may be considered, such as those described herein, may be used to help provide the third-party host system recommendation.

At 660, the system 100 may receive, from the client device, a third party host system selection. In some examples, the third-party host system selection may be based on the at least one third-party host system recommendation. In some examples, the third-party host system selection may be independently made by users of the client devices 110 and/or automatically determined by the system 100, the client devices 110, and/or the host systems 140 based on various data, such as user preferences, hardware capabilities, location data, and/or other factors, as described herein.

At 670, the system 100 may receive a third-party host connection acceptance from the selected third-party host system. In some examples, the third-party host connection acceptance may be independently made by users of the of the third-party hardware, e.g., any one of the host systems 140. In some examples, the third-party host connection acceptance may be automatically by the system 100 based on the host system registration data, which may include user preferences, hardware capabilities, other available host systems, schedule or availability, location data, and/or other factors, as described herein.

At 680, the system 100 may facilitate establishment of the connection over a network between the client device and the selected third-party host system. In this way, the selected third-party host system may host the third-party interactive media on behalf of the client device and for the client device to interact with the third-party interactive media hosted on the selected third-party host system. In some examples, the connection established may allow the client device to access, stream, and interact with interactive entertainment or digital media content, such as video games, from the selected third-party host system.

By providing low latency interactive media distribution using shared user hardware as described herein, the systems and methods described herein may also provide improved load balancing of network components, maximize utilization of resources, increase speed of processing, and minimize energy consumption. It should be appreciated that examples described herein may have a flexible structure and offer many advantages over other solutions.

Although the methods and systems as described herein may be directed mainly to interactive entertainment or digital media content, such as video games, it should be appreciated that the system 100 may be used for other types of content or scenarios. Furthermore, the system 100 may also use the techniques disclosed herein in other various environments, such as in load balancing systems, distributed architecture schemes, or for various digital content processing or transactions, such as advertisement transactions, payment transactions, online transactions, mobile transactions, user-to-user transactions, toll-based transactions, and/or digital transactions. Other applications or uses of the system 100 may also include social networking, competitive, marketing, performance analysis, risk analysis, data management, content-based recommendation engines, and/or other types of knowledge or data-driven systems.

It should be noted that the functionality described herein may be subject to one or more privacy policies, described below, enforced by the system 100 that may bar use of images for concept detection, recommendation, generation, and analysis.

In particular examples, one or more objects (e.g., content or other types of objects) of a computing system may be associated with one or more privacy settings. The one or more objects may be stored on or otherwise associated with any suitable computing system or application, such as, for example, the system 100, the client devices 110, the host systems 140, the external system 130, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the system 100 or shared with other systems (e.g., an external system 130). Although this disclosure describes using particular privacy settings in a particular manner, this disclosure contemplates using any suitable privacy settings in any suitable manner.

In particular examples, the system 100 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the system 100 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example and not by way of limitation, a first user may specify that other users who attend the same university as the first user may view the first user's pictures, but that other users who are family members of the first user may not view those same pictures.

In particular examples, the system 100 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the system 100 may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The system 100 may access such information in order to provide a particular function or service to the first user, without the system 100 having access to that information for any other purposes. Before accessing, storing, or using such objects or information, the system 100 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the system 100.

In particular examples, a user may specify whether particular types of objects or information associated with the first user may be accessed, stored, or used by the system 100. As an example and not by way of limitation, the first user may specify that images sent by the first user through the system 100 may not be stored by the system 100. As another example and not by way of limitation, a first user may specify that messages sent from the first user to a particular second user may not be stored by the system 100. As yet another example and not by way of limitation, a first user may specify that all objects sent via a particular application may be saved by the system 100.

In particular examples, privacy settings may allow a first user to specify whether particular objects or information associated with the first user may be accessed from client devices 110 or external systems 130. The privacy settings may allow the first user to opt in or opt out of having objects or information accessed from a particular device (e.g., the phone book on a user's smart phone), from a particular application (e.g., a messaging app), or from a particular system (e.g., an email server). The system 100 may provide default privacy settings with respect to each device, system, or application, and/or the first user may be prompted to specify a particular privacy setting for each context. As an example and not by way of limitation, the first user may utilize a location-services feature of the system 100 to provide recommendations for restaurants or other places in proximity to the user. The first user's default privacy settings may specify that the system 100 may use location information provided from one of the client devices 110 of the first user to provide the location-based services, but that the system 100 may not store the location information of the first user or provide it to any external system 130. The first user may then update the privacy settings to allow location information to be used by a third-party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The system 100 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the system 100 may use a user's previous activities and calculated moods, emotions, or sentiments to determine a present mood, emotion, or sentiment. A user who wishes to enable this functionality may indicate in their privacy settings that they opt in to the system 100 receiving the inputs necessary to determine the mood, emotion, or sentiment. As an example and not by way of limitation, the system 100 may determine that a default privacy setting is to not receive any information necessary for determining mood, emotion, or sentiment until there is an express indication from a user that the system 100 may do so. By contrast, if a user does not opt in to the system 100 receiving these inputs (or affirmatively opts out of the system 100 receiving these inputs), the system 100 may be prevented from receiving, collecting, logging, or storing these inputs or any information associated with these inputs. In particular examples, the system 100 may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the system 100 may use the user's mood, emotion, or sentiment to provide newsfeed items, pages, friends, or advertisements to a user. The user may specify in their privacy settings that the system 100 may determine the user's mood, emotion, or sentiment. The user may then be asked to provide additional privacy settings to indicate the purposes for which the user's mood, emotion, or sentiment may be used. The user may indicate that the system 100 may use his or her mood, emotion, or sentiment to provide newsfeed content and recommend pages, but not for recommending friends or advertisements. The system 100 may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the system 100 may be restricted in its access, storage, or use of the objects or information. The system 100 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the system 100 may temporarily store the message in a content data store until the second user has viewed or downloaded the message, at which point the system 100 may delete the message from the data store. As another example and not by way of limitation, continuing with the prior example, the message may be stored for a specified period of time (e.g., 2 weeks), after which point the system 100 may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the system 100 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the system 100. The user's privacy settings may specify that such information may be used only for particular processes, such as authentication, and further specify that such information may not be shared with any external system 130 or used for other processes or applications associated with the system 100. As another example and not by way of limitation, the system 100 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any external system 130 or used by other processes or applications associated with the system 100. As another example and not by way of limitation, the system 100 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any external system 130 or used by other processes or applications associated with the system 100.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The system 100 may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the system 100 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the system 100 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the system 100 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the system 100 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the system 100 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the system 100 may send a reminder to the user to confirm his or her privacy settings every six months or after every ten photo posts. In particular examples, privacy settings may also allow users to control access to the objects or information on a per-request basis. As an example and not by way of limitation, the system 100 may notify the user whenever an external system 130 attempts to access information associated with the user, and require the user to provide verification that access should be allowed before proceeding.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
a processor; and
a memory storing instructions, which when executed by the processor, cause the processor to:
register third-party host systems as candidate host systems to host interactive media on behalf of client devices, wherein the third-party host systems comprise personal computing hardware owned and shared by individuals;
receive client device registration data of a client device;
select a third-party host system from the candidate host systems to host interactive media on behalf of the client device, wherein selecting the host system from the candidate host systems is based on user input in response to host system recommendations based at least in part on hardware performance requirements, geographic location data, or preferences of the interactive media and relative computing performances of the host system and the client device; and
facilitate establishment of a connection over a network between the client device and the selected third-party host system to cause the selected third-party host system to host the interactive media on behalf of the client device and for the client device to interact with the interactive media hosted on the selected third-party host system.

2. The system of claim 1, wherein to register third-party host systems as candidate host systems, the instructions cause the processor to:
receive host registration data from the candidate host systems, wherein the host registration data comprises at least one of host hardware specification data, geographic location data, host system availability data, or host system owner profile data.

3. The system of claim 2, wherein to register third-party host systems as candidate host systems, the instructions cause the processor to:
determine that the host hardware specification data from the host registration data meets predetermined minimum host hardware specification criteria; and
register the third-party host systems across a distributed geography.

4. The system of claim 3, wherein the predetermined minimum host hardware specification criteria is based on the interactive media.

5. The system of claim 2, wherein to select the third-party host system from the candidate host systems to host the interactive media on behalf of the client device, the instructions cause the processor to:
select the third-party host system based on at least one of the client device registration data and the host registration data.

6. The system of claim 5, wherein the client device registration data comprises at least one of client device hardware specification data, client device performance data, geographic location data, or client device user profile data.

7. The system of claim 6, wherein to select the third-party host system from the candidate host systems to host the interactive media on behalf of the client device, the instructions cause the processor to:
select the third-party host system based on the geographical location data of the client device and the geographical location data of the candidate host systems.

8. The system of claim 2, wherein the instructions cause the processor to receive updates and changes to the host registration data from the registered third-party host systems.

9. The system of claim 1, wherein to facilitate establishment of a connection between the client device and at least one registered third-party host system, the instructions cause the processor to:
receive a host connection request from the client device to establish a connection with the selected third-party host system; and
receive a host connection acceptance from the selected host system.

10. The system of claim 9, wherein to facilitate establishment of a connection between the client device and at least one registered third-party host system, the instructions cause the processor to:
provide, to the client device, in response to the host connection request, at least one alternative third-party host system recommendation in an event the selected third-party host system is unavailable for at least a duration of time specified in the host connection request from the client device.

11. A method, comprising:

receiving, by a processor, host registration data of host systems, wherein the host systems are third-party host systems situated across a distributed geography, and wherein the third-party host systems comprise personal computing hardware owned and shared by individuals;

registering, by the processor, the host systems as candidate host systems to host third-party interactive media on behalf of client devices, wherein the registered host systems meet predetermined minimum third-party host system criteria, wherein the predetermined minimum third-party host system criteria is based on user input in response to host system recommendations based at least in part on hardware performance requirements, geographic location data, or preferences of the interactive media and relative computing performances of the host system and the client device;

receiving, by the processor, client device registration data of a client device;

receiving, by the processor, a third-party host connection request from the client device to establish a connection with at least one of the registered host systems;

providing, by the processor and to the client device, in response to the third-party host connection request, at least one third-party host system recommendation;

receiving, by the processor and from the client device, a third-party host system selection based on the at least one third-party host system recommendation;

receiving, by the processor, a third-party host connection acceptance from the selected third-party host system; and facilitating, by the processor, establishment of the connection over a network between the client device and the selected third-party host system to cause the selected third-party host system to host the third-party interactive media on behalf of the client device and for the client device to interact with the third-party interactive media hosted on the selected third-party host system.

12. The method of claim 11, wherein receiving host registration data further comprises receiving host registration data comprising at least one of host hardware specification data, geographic location data, host system availability data, or host system owner profile data.

13. The method of claim 11, further comprising:

determining, by the processor, which of the host systems meet the predetermined minimum third-party host system criteria; and registering, by the processor, the host systems that meet the predetermined minimum third-party host system criteria as the candidate host systems, wherein the predetermined minimum third-party host system criteria is based on the third-party interactive media requirements.

14. The method of claim 11, wherein receiving the client device registration data comprises receiving client device registration data comprising at least one of client device hardware specification data, client device performance data, geographic location data, or client device user profile data.

15. The method of claim 11, wherein receiving the third-party host system selection further comprises receiving the at least one third-party host system recommendation based on an artificial intelligence (AI) based machine learning technique using on at least one of the host registration data, the client device registration data, or the third-party interactive media.

16. A non-transitory computer-readable storage medium having an executable stored thereon, which when executed instructs a processor to:

receive host registration data of host systems, wherein the host systems are third-party host systems situated across a distributed geography, and wherein the third-party host systems comprise personal computing hardware owned and shared by individuals;

register the host systems as candidate host systems to host third-party interactive media on behalf of client devices, wherein the registered host systems meet predetermined minimum third-party host system criteria, wherein the predetermined minimum third-party host system criteria is based on user input in response to host system recommendations based at least in part on hardware performance requirements, geographic location data, or preferences of the interactive media and relative computing performances of the host system and the client device;

receive client device registration data of a client device;

receive a third-party host connection request from the client device;

provide, to the client device, in response to the third-party host connection request, at least one third-party host system recommendation, wherein the third-party host system recommendation is based at least in part on hardware performance requirements or preferences of the interactive media and relative computing performances of the host system and the client device;

receive, from the client device, a third-party host system selection based on the at least one third-party host system recommendation;

receive a third-party host connection acceptance from the selected third-party host system; and facilitate establishment of a connection over a network between the client device and the selected third-party host system to cause the selected third-party host system to host the third-party interactive media on behalf of the client device and for the client device to interact with the third-party interactive media hosted on the selected third-party host system.

17. The non-transitory computer-readable storage medium of claim 16, wherein:

the host registration data comprises at least one of host hardware specification data, geographic location data, host system availability data, or host system owner profile data; and the client device registration data comprises at least one of client device hardware specification data, client device performance data, geographic location data, or client device user profile data.

18. The non-transitory computer-readable storage medium of claim 16, wherein the at least one third-party host system recommendation is based on at least one of the host registration data, the client device registration data, or the third-party interactive media.

\* \* \* \* \*